March 2, 1954 H. ELOFSON 2,670,775
STALK AND STRAW DISINTEGRATING AND SCATTERING DEVICE
Filed Feb. 12, 1951
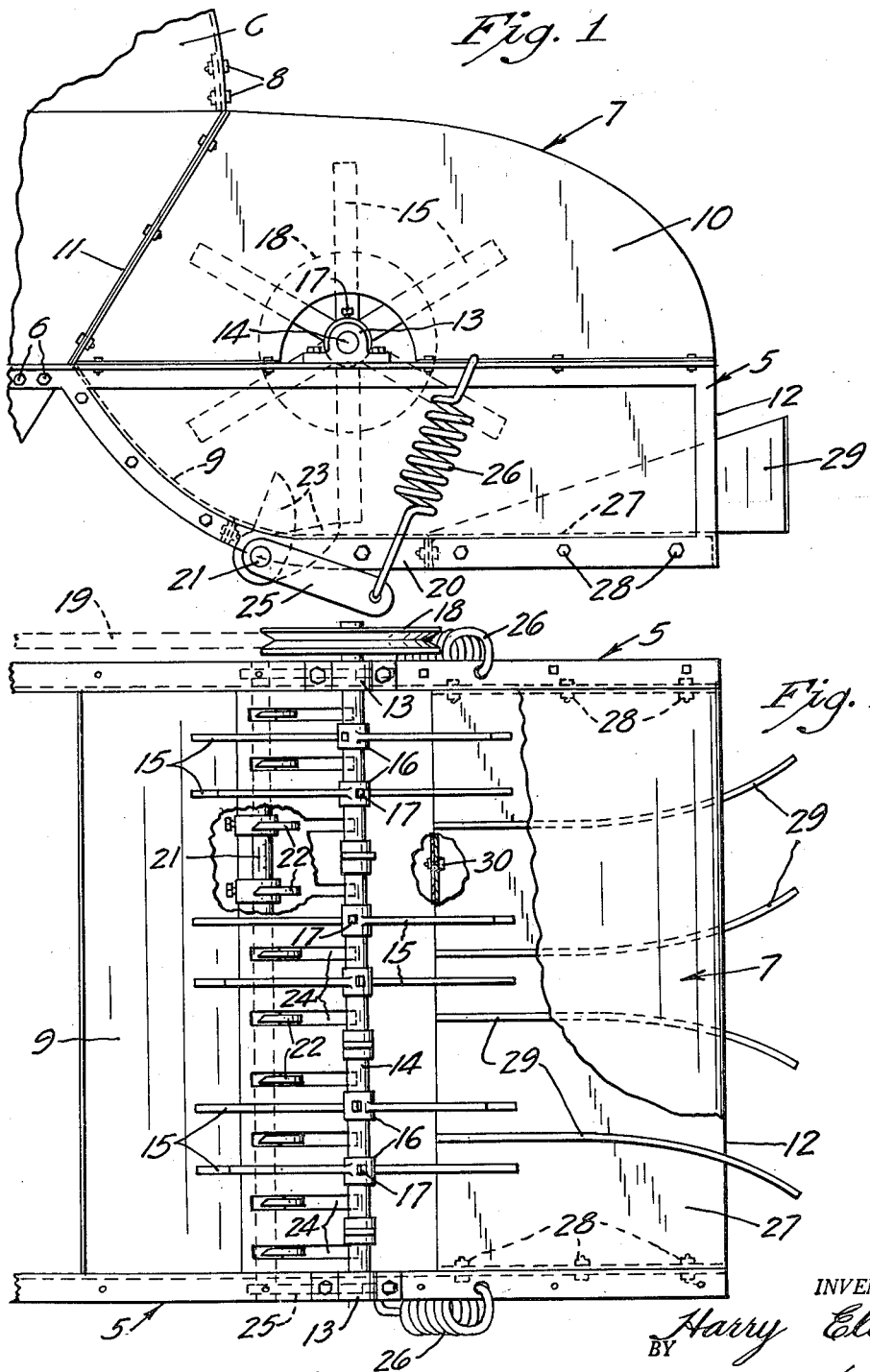
INVENTOR.
Harry Elofson
BY
Williamson & Williamson
ATTORNEYS Patented Mar. 2, 1954

2,670,775

UNITED STATES PATENT OFFICE 2,670,775

STALK AND STRAW DISINTEGRATING AND SCATTERING DEVICE

Harry Elofson, East Grand Forks, Minn.

Application February 12, 1951, Serial No. 210,481

2 Claims. (Cl. 146—121)

1

This invention relates to combines and other harvesting machines which remove and separate the grain, kernels, fruit or natural food products from the stalks and straw of crops and which normally discharge the straw from the delivery end of the machine. It has particular relation to the disintegration and wide scattering of the disintegrated particles of stalks and straw continually throughout the operation of the machine.

Harvesters or combines, when operating under adverse operating conditions, occasionally encounter and engage relatively large clumps of stalks and straw which are not properly separated as a result of passing through the harvester. The most frequent cause of such failure to separate and divide such large clumps is that the particular crop being harvested may be in a damp or even relatively wet condition with the result that the stalks and straw are considerably tougher and resist to a much greater extent the disintegration and separation thereof. As a result, such clumps of straw occasionally pass through the combine or harvester and are discharged in substantially the same condition as that in which it entered the combine.

Disintegrating and scattering devices previously known have not been able to cope with such large clumps of relatively tough material in a satisfactory manner. Most of such devices are unable to handle such a large tough clump of material, and as a result, become clogged and in turn clog the harvester. Others are adapted so that large clumps can not be admitted into the disintegrating apparatus with the result that such a clump will ride for a prolonged period at the entrance of such disintegrating mechanism. It is obvious, of course, that if a large clump of such material rides for a prolonged period across the mouth of the disintegrating mechanism, a back-log of stalks and straw will be created with consequent plugging or clogging of the harvester.

It is a general object of my invention to provide an improved disintegrating and scattering device for stalks and straw discharged by a combine or other harvester which is simple and cheap to construct and which operates with increased efficiency.

A more specific object is to provide an improved stalk and straw disintegrating and scattering device adapted for use as an attachment or as standard equipment in various harvesting machines such as grain combines.

Another object is to provide a stalk and straw disintegrating and scattering machine or attachment adapted to be readily applied to the stalk or straw discharge of conventional combines and the like and adapted to cause, in cooperation with the stalk directing facilities of the combine, the stalks and straw to be finely disintegrated and to be uniformly scattered behind the combine without requiring additional rotary mechanism for such scattering.

Another object is to provide a novel and improved straw scattering and disintegrating device wherein the disintegrating elements thereof simultaneously impart momentum to the disintegrated particles to cause the latter to be ejected with substantial force against cooperating guide elements provided therefor to effect uniform distribution of such particles over a wide area to the rear of the combine.

Another object is to provide a mechanism of the class described capable of receiving large clumps of heavy, wet straw or stalks from the discharge of the harvester and of discharging the same without plugging or clogging of the harvester.

Another object is to provide a novel and improved straw disintegrating and scattering machine or attachment wherein at least one set of cooperating disintegrator elements are capable of being swung out of cooperating position to permit large and tough clumps of stalks and straw to pass freely thereover and to thereby avoid clogging the harvester.

A further object is to provide a novel and improved stalk and straw disintegrating and scattering machine or attachment wherein the disintegrator elements operate at least in part to crush and break the straw into fine particles in contrast to a scissor-like cutting action.

A still further object is to provide a stalk and straw disintegrating and scattering device wherein the flow-directing portions of the scattering mechanism are readily removable, replaceable, and exchangeable to permit adjustment of the direction of the spreading action and of the extent of area over which such spreading action is extended.

These and other objects and advantages of our invention will more fully appear from the following description made in connection with the accompanying drawings wherein like reference characters refer to the same or similar parts throughout the several views and in which:

Fig. 1 is a side elevational view of one embodiment of my invention attached to a combine; and Fig. 2 is a top plan view of the same with a very substantial portion of the housing broken away to show the operating parts of the device.

One embodiment of my invention may include as shown in Figs. 1 and 2 a pair of metal framework pieces indicated generally as 5, each of which is adapted to be connected adjacent the discharge opening of a combine C as shown in Fig. 1 by a plurality of bolts or rivets indicated as 6. As best shown in Fig. 1, this framework 5 is of trapezoidal shape and is constructed preferably of angle iron or other rigid metal bars. A stiff metal housing 7 is extended over these frameworks 5 (which are connected to opposite sides of the combine) and is connected to the rear portion of the combine C in any suitable manner, such as by bolts 8. This housing 7 is provided with an inclined bottom plate 9, with side plates 10, an open mouth 11 and a discharge passage 12 opening toward the rear. As shown, the mouth 11 is mounted transversely across the discharge of the combine to receive stalks and straw normally discharged therefrom by the inherently downwardly directing discharge mechanism of the combine C.

Mounted on the upper surface of each of the framework pieces 5 is a bearing 13 within which a transversely extending horizontal shaft 14 is journaled. This shaft 14 may have a flattened side or be keyed or adapted in any other suitable manner to receive and have secured thereto a plurality of pairs of oppositely extending crusher arms 15. As shown, these crusher arms are arranged in pairs and in staggered relation with respect to each other and extend in opposite directions from a sleeve 16 having an internal diameter equal to the external diameter of the shaft 14. Set screws 17 provide for lateral adjustment of these sleeves 16 and their crusher arms 15. The crusher arms are in reality merely blunt metal arms which extend outwardly from the sleeves to a position a short distance above the bottom of the housing as best shown in Fig. 1. Mounted on one end of the shaft 14 outside the housing 7 and the framework pieces is a pulley 18 adapted to be driven by a V-belt 19 connected to a source of rotary power which may be provided by a similar pulley driven by the combine or a separate source of power (both not shown).

Fixedly secured to the lower left hand corner of the trapezoidal shaped framework pieces 5 is a pair of support arms 20. These support arms extend forwardly and have journaled in their forward end a transversely extending freely pivotable shaft 21. Fixedly mounted at spaced intervals on the shaft 21 is a plurality of knives 22, the forward edge 23 of which is sharpened. As shown, these knives are held in place by means of set screws but may be secured in any suitable manner. These knives 22 extend upwardly through the bottom plate 9 in slots 24 provided for that purpose. These slots 24 also extend rearwardly to permit the knives 22 to swing rearwardly to a horizontal position when necessary. Fixedly secured to the outer ends of the shaft 21 is a lever arm 25 which extends rearwardly and has its rearward end connected to the upper portion of the framework pieces 5 by a tension spring 26 as best shown in Fig. 1.

Removably secured to the rear and bottom portion of the housing 7 is a flat plate 27 which extends rearwardly to a point adjacent the rear of the housing. This plate is flanged at each of its ends and these flanges are adapted to be removably secured to the framework pieces 5 by means of bolts 28. Fixedly secured on the upper surface of this plate 27 is a plurality of triangularly shaped fins 29 which are curved in opposite directions as best shown in Fig. 2. These fins 29 may be welded to the plate 27 or they may be secured by means of bolts or rivets 30 as shown in Fig. 2. In any event, they are normally disposed directly behind the slots 24 and the knives 22 and the tapered point thereof is positioned but a short distance behind such knives. The fins 29 may, if desired, be all shaped so as to be curved in the same direction or in any other desired manner, depending upon the direction to which the comminuted material is desired to be discharged. These additional forms of fins 29 have not been shown for the sake of brevity.

In operation, the straw and stalks handled by the combine C are discharged through the discharge opening of the combine and into the mouth 11 of the device embodying my invention as shown in Figs. 1 and 2. The shaft 14 is rotated rapidly (in the neighborhood of 2500 to 3000 R. P. M.). The crusher arms 15, of course, will rotate at the same speed and engage the stalks and straw as it enters the housing 7 driving the same downwardly against and across the upstanding knives 22. The tension spring 26 will at all times under normal conditions maintain the knives 22 in upright position so that the arms 15 will normally pass therebetween to effectively crush and break the straw into pieces of the desired lengths.

Under normally dry conditions the rapid speed of the crusher arms 15 is more than sufficient to crush and break the straw as fine as is desired by passing between the knives 22. However, when the grain is considerably more damp than usual, the stalks and straws are considerably tougher than usual and this crushing action may not be sufficient. If desired, the sleeves 16 may be shifted longitudinally of the shaft 14 by loosening the set screws 17 to a position where a cooperating shearing action may be attained between the crusher arms and the knives 22. This, however, is not normally required.

After the stalks and straw have been comminuted as described above, they are discharged rearwardly across the plate 27 and between the fins 29. This comminuted material is propelled rearwardly through the rearward motion provided thereto by the rapid rotation of the crusher arms 15 and its engagement thereby. Thus, the comminuted material is propelled rearwardly at a high speed as a direct result of the action provided by the comminuting mechanism and no additional rotary mechanism is necessary to scatter the comminuted material effectively over a wide area. Instead, the rearwardly propelled particles are ejected rearwardly between the fins 29 and directed to either side by the inherent curvature of the fins 29. The result is a uniform and widespread scattering of the comminuted material over the area to the rear of the combine.

My disintegrating and scattering device is adapted to be utilized either as an attachment or as standard equipment for combines, harvesters, and the like. It is adapted to be adjusted to provide either a crushing or a shearing action. The crushing action is preferred, however, since it requires a minimum of power.

It should be noted that my device is highly effective in the handling of stalks and straw even though they may be discharged from the combine C in large clumps of relatively tough material. As previously pointed out, such clumps normally cause considerable difficulty in devices of this nature and frequently result in clogging of the same. When such a clump is received by my device, the crusher arms drive it rearwardly and if it is sufficiently tough to prevent disintegration of the same, the knives 22 will be caused to swing rearwardly to a substantially horizontal position as shown in Fig. 1 and the clump will pass thereover. This, of course, means that the spring 26 will be flexed and the rearward end of the lever arm 25 will swing downwardly. Once the clump has passed the knives 22, the spring 26 will cause the knives 22 to assume their normal position and the crusher arms 15 will propel the clump rearwardly either between or over the top of the fins 29, depending upon, of course, the size of the clump. In any event, valuable time will not be lost in attempting to declog the machine as a result of an occasional wet clump of grain being handled and discharged by the combine C.

It should be noted that the scatter-directing fins 29 are removable, replaceable, and exchangeable so that the comminuted material may be discharged either directly behind the combine C or to either side thereof.

Thus it may be seen that I have provided a cheap and simply constructed device capable of operating with increased efficiency to effectively comminute and scatter stalks and straw regardless of their nature when received from the discharge of the combine. I have thereby eliminated the serious loss of time which so frequently results during harvesting season and of valuable and relatively scarce equipment being delayed during the harvesting operation in order to permit the same to be freed of clogging material which may have been received therein.

It will, of course, be understood that various changes may be made in the form, details, arrangement and proportions of the various parts without departure from the scope of the present invention, which, generally stated, consists in the matter shown, and described, and set forth in the appended claims.

What I claim is:

1. A straw and stalk disintegrating and scattering device for a harvesting machine having a rear outlet, said device comprising a housing adapted to be mounted about the outlet of the harvester and having a front wall provided with an inlet, a top, side walls, and a rear wall formed with an outlet, a bottom for said housing extending the full distance between the inlet and the outlet and provided with a plurality of longitudinally extending slots spaced transversely from each other, bearings mounted at opposite sides of said housing, a shaft extending through said housing transversely thereof above said slots and rotatably mounted in said bearings, crusher arms carried by and extending radially from said shaft, a second shaft extending transversely of said housing under the bottom and at opposite ends being rotatably supported from the housing, knives carried by and extending radially from the second shaft in position for passing upwardly through said slots and into said housing to a raised and operative position between the crusher arms of the first shaft, levers carried by opposite ends of the second shaft outwardly of opposite sides of the housing and extending rearwardly of the housing, and springs connected with and extending downwardly from the opposite sides of the housing and having lower ends connected with rear ends of said levers, said springs exerting upward pull upon the levers to turn the second shaft and yieldably hold the knives in the raised and operative position.

2. A straw and stalk disintegrating and scattering device for a harvesting machine having a rear outlet, said device comprising a housing adapted to be mounted about the outlet of the harvester and having a front wall provided with an inlet, a top, side walls, and a rear wall formed with an outlet, a bottom for said housing extending the full distance between the inlet and the outlet and provided with a plurality of longitudinally extending slots spaced transversely from each other, bearings mounted at opposite sides of said housing, a shaft extending through said housing transversely thereof above said slots and rotatably mounted in said bearings, crusher arms carried by and extending radially from said shaft, a second shaft extending transversely of said housing under the bottom thereof and at opposite ends being rotatably mounted upon said housing adjacent its bottom, knives carried by and extending radially from said second shaft in position for passing upwardly through said slots and into said housing to a raised and operative position between the crusher arms of said first shaft, a lever carried by one end portion of said second shaft outwardly of the side walls of said housing, and a spring connected by one of its end portions with said lever at a point spaced from said second shaft and extending away from said lever and being connected by its opposite end portion to said housing, said spring exerting a pull upon said lever to turn said second shaft and yieldably hold said knives in the raised and operative position.

HARRY ELOFSON.

References Cited in the file of this patent

UNITED STATES PATENTS

| Number | Name | Date |
| --- | --- | --- |
| 825,426 | Smith | July 10, 1906 |
| 918,285 | Clark | Apr. 13, 1909 |
| 923,324 | Brost | June 1, 1909 |
| 999,932 | Wetterhold | Aug. 8, 1911 |
| 1,191,853 | Thompson | July 18, 1916 |
| 1,968,417 | Morine | July 31, 1934 |
| 2,213,906 | Ebersol | Sept. 3, 1940 |
| 2,305,159 | Heckman et al. | Dec. 15, 1942 |
| 2,528,232 | Krause | Oct. 31, 1950 |
| 2,554,669 | Elofson | May 29, 1951 |
| 2,558,530 | Wimperis | June 26, 1951 |